(12) United States Patent
Seum

(10) Patent No.: US 6,305,057 B1
(45) Date of Patent: Oct. 23, 2001

(54) HEADLINER PINNING ASSEMBLY

(76) Inventor: Erwin R. Seum, 11138 Hebron Rd. Southeast P.O. Box 1765, Buckeye Lake, OH (US) 43008-1765

( * ) Notice: Subject to any disclaimer, the term of this patent is extended or adjusted under 35 U.S.C. 154(b) by 0 days.

(21) Appl. No.: 09/621,982

(22) Filed: Jul. 21, 2000

(51) Int. Cl.[7] ............................. A44B 1/32; F16B 21/00
(52) U.S. Cl. ..................... 24/711; 24/114.4; 24/114.7; 24/114.9; 24/716; 411/339
(58) Field of Search .................. 24/711, 114.4, 24/114.7, 114.9, 716; 411/339, 338, 525, 526

(56) References Cited

U.S. PATENT DOCUMENTS

| 103,915 | * | 6/1870 | Newton ................................. 24/711 |
| D. 344,692 | | 3/1994 | Ruston . |
| 517,725 | * | 4/1894 | Bornstein ............................... 24/711 |
| 772,280 | | 10/1904 | Hyde, Jr. . |
| 1,435,134 | | 11/1922 | Boley . |
| 1,645,500 | * | 10/1927 | Fenton et al. ......................... 24/711 |
| 1,771,901 | * | 7/1930 | Reiter .................................... 24/711 |
| 1,938,878 | * | 12/1933 | Van Blankensteyn .............. 24/114.4 |
| 1,980,758 | | 11/1934 | Komorous . |
| 2,334,662 | * | 11/1943 | Welch ................................... 24/711 |
| 3,009,381 | * | 11/1961 | Rapata ................................ 24/114.4 |
| 3,623,192 | * | 11/1971 | Papazian ............................ 24/114.4 |
| 3,995,821 | | 12/1976 | Einhorn . |
| 5,186,517 | | 2/1993 | Gimore et al. . |
| 5,433,571 | | 7/1995 | Allison . |

FOREIGN PATENT DOCUMENTS

0721178 * 2/1932 (FR) ..................................... 24/711

* cited by examiner

Primary Examiner—Victor N. Sakran

(57) ABSTRACT

A headliner pinning assembly for repairing or providing supplemental decoration to the headliner of a vehicle. The headliner pinning assembly includes a first pin member having a head portion and a spike portion extending outwardly from the head portion, a second pin member having a coiled medial portion and a pair of opposite ends extending outwardly from the coiled medial portion, and a washer.

15 Claims, 1 Drawing Sheet

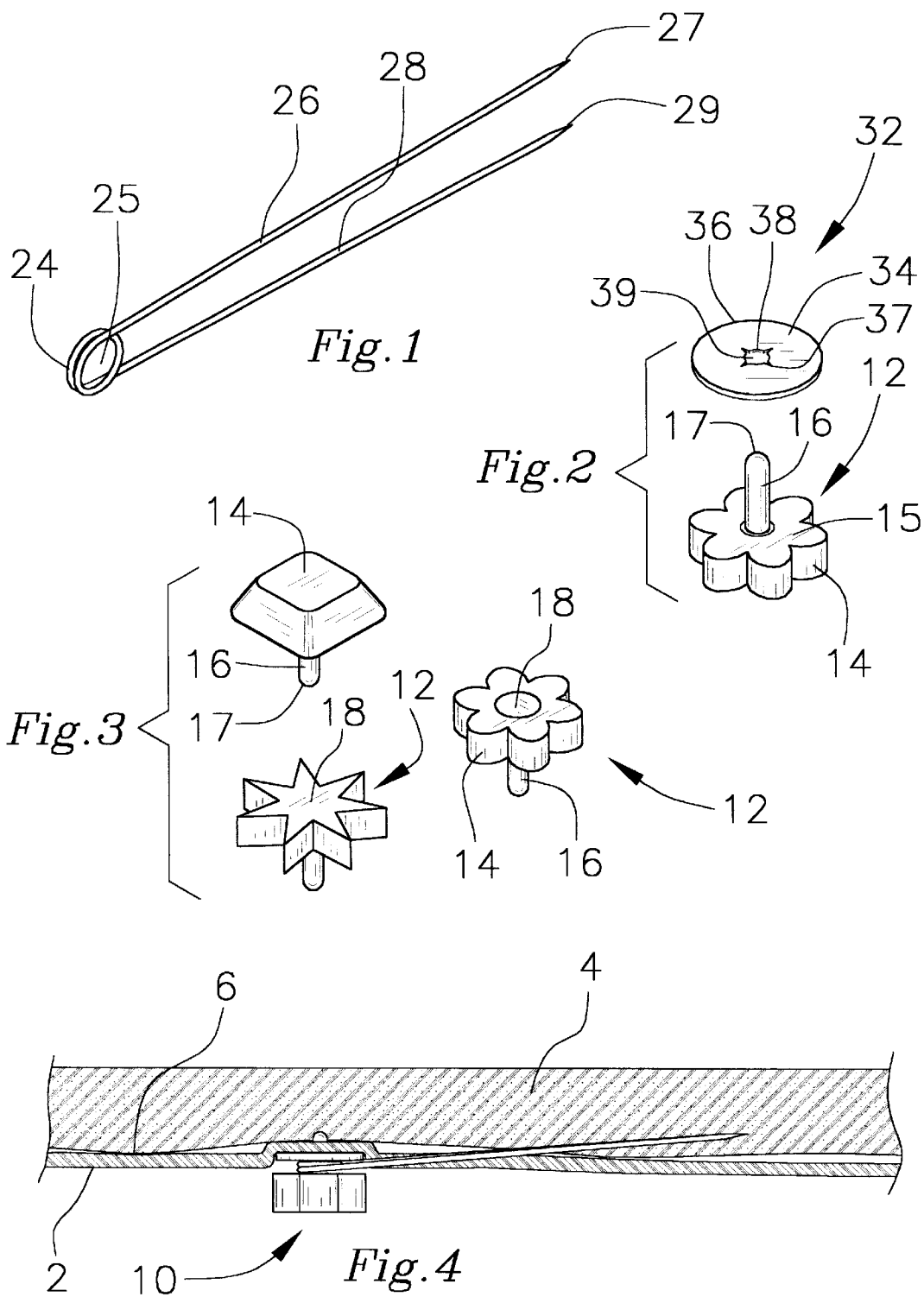

HEADLINER PINNING ASSEMBLY

BACKGROUND OF THE INVENTION

1. Field of the Invention

The present invention relates to headliner pins and more particularly pertains to a new headliner pinning assembly for repairing or providing supplemental decoration to the headliner of a vehicle.

2. Description of the Prior Art

The use of headliner pins is known in the prior art. More specifically, headliner pins heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,433,571; U.S. Pat. No. 772,280; U.S. Pat. No. 1,980,758; U.S. Pat. No. Des. 344,692; U.S. Pat. No. 3,995,821; U.S. Pat. No. 1,435,134; and U.S. Pat. No. 5,186,517.

While these devices fulfill their respective, particular objectives and requirements, the aforementioned patents do not disclose a new headliner pinning assembly. The inventive device includes a first pin member having a head portion and a spike portion extending outwardly from the head portion, a second pin member having a coiled medial portion and a pair of opposite ends extending outwardly from the coiled medial portion, and a washer.

In these respects, the headliner pinning assembly according to the present invention substantially departs from the conventional concepts and designs of the prior art, and in so doing provides an apparatus primarily developed for the purpose of repairing or providing supplemental decoration to the headliner of a vehicle.

SUMMARY OF THE INVENTION

In view of the foregoing disadvantages inherent in the known types of headliner pins now present in the prior art, the present invention provides a new headliner pinning assembly construction wherein the same can be utilized for repairing or providing supplemental decoration to the headliner of a vehicle.

The general purpose of the present invention, which will be described subsequently in greater detail, is to provide a new headliner pinning assembly apparatus and method which has many of the advantages of the headliner pins mentioned heretofore and many novel features that result in a new headliner pinning assembly which is not anticipated, rendered obvious, suggested, or even implied by any of the prior art headliner pins, either alone or in any combination thereof.

To attain this, the present invention generally comprises a first pin member having a head portion and a spike portion extending outwardly from the head portion, a second pin member having a coiled medial portion and a pair of opposite ends extending outwardly from the coiled medial portion, and a washer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new headliner pinning assembly apparatus and method which has many of the advantages of the headliner pins mentioned heretofore and many novel features that result in a new headliner pinning assembly which is not anticipated, rendered obvious, suggested, or even implied by any of the prior art headliner pins, either alone or in any combination thereof.

It is another object of the present invention to provide a new headliner pinning assembly that may be easily and efficiently manufactured and marketed.

It is a further object of the present invention to provide a new headliner pinning assembly that is of a durable and reliable construction.

An even further object of the present invention is to provide a new headliner pinning assembly which is susceptible of a low cost of manufacture with regard to both materials and labor, and which accordingly is then susceptible of low prices of sale to the consuming public, thereby making such headliner pinning assembly economically available to the buying public.

Still yet another object of the present invention is to provide a new headliner pinning assembly which provides in the apparatuses and methods of the prior art some of the advantages thereof, while simultaneously overcoming some of the disadvantages normally associated therewith.

Still another object of the present invention is to provide a new headliner pinning assembly for repairing or providing supplemental decoration to the headliner of a vehicle.

Yet another object of the present invention is to provide a new headliner pinning assembly which includes a first pin member having a head portion and a spike portion extending outwardly from the head portion, a second pin member having a coiled medial portion and a pair of opposite ends extending outwardly from the coiled medial portion, and a washer.

Still yet another object of the present invention is to provide a new headliner pinning assembly that provides a first pin member and a second pin member for inserting through the headliner into a foam backing to stabilize the first pin member relative to the headliner. A connecting washer is coupled to a spike portion of the first pin member to couple the first pin member to the second pin member.

Even still another object of the present invention is to provide a new headliner pinning assembly that provides a first pin member that has a decorative head portion for enhancing the appearance of the headliner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the second pin member of a new headliner pinning assembly according to the present invention.

FIG. 2 is a perspective exploded view of the first pin member and the washer of the present invention.

FIG. 3 is a perspective view of first pin members according to the present invention.

FIG. 4 is a side view of the present invention in use.

DESCRIPTION OF THE PREFERRED EMBODIMENT

With reference now to the drawings, and in particular to FIGS. 1 through 4 thereof, a new headliner pinning assembly embodying the principles and concepts of the present invention and generally designated by the reference numeral 10 will be described.

As best illustrated in FIGS. 1 through 4, the headliner pinning assembly 10 generally comprises a first pin member 12, a second pin member 22, and a washer 32. The first pin member 12 includes a head portion 14 and a spike portion 16. The second pin member 22 includes a medial portion 24 and a pair of opposite end portions 26 and 28 extending outwardly from the medial portion 24. The medial portion 24 forms a loop 25. The spike portion 16 is insertable through the loop 25. The washer 32 is designed for coupling to the spike portion 16 of the first pin member 12 such that the second pin member 22 is engaged to the first pin member 12 between the head portion 14 and the washer 32.

The opposite end portions 26 and 28 of the second pin member 22 are adapted for inserting through a headliner 2 and into a foam backing 4 adjacent the headliner 2. Thus, the first pin member 12 is held in a static position relative to the headliner 2.

The opposite end portions 26 and 28 of the second pin member 22 are coplanar with the loop 25 such that the opposite end portions 26 and 28 extend generally orthogonally away from the spike portion 16 of the first pin member 12. Thus, the opposite end portions 26 and 28 extend into the foam backing 4 at an acute angle relative to an outer surface 6 of the foam backing 4 to strengthen the attachment of the first pin member as opposed to prior art pins that rely on insertion transverse to the outer surface 6.

In an embodiment, the head portion 14 of the first pin member 12 includes a decorative configuration for enhancing the appearance of the headliner 2. Various decorative configurations may be employed including stars, flowers and geometric shapes.

The washer 32 is generally a planar disc 34 that includes an outer perimeter edge 36, an inner perimeter edge 38 and a hollow center 39. Ideally, the spike portion 16 of the first pin member 12 has a diameter greater than a diameter of the inner perimeter edge 38 so that the inner perimeter edge 38 frictionally engages the spike portion 16 when the spike portion 16 is inserted through the hollow center 38 of the washer 32.

In an embodiment, a plurality of slits 37 extend from the inner perimeter edge 38 for facilitating engagement of the inner perimeter edge 38 of the washer 32 to the spike portion 16 of the first pin member 12.

The head portion 14 of the first pin member 12 includes a central portion 18. The central portion 18 ideally has a diameter greater than a diameter of the outer perimeter edge 36 of the washer 32 so that the washer 32 is concealed by the head portion 14 when the opposite end portions 26 and 28 of the second pin member 22 are inserted into the headliner 2 and the foam backing 4 such that the washer 32 is positioned between the head portion 14 and the headliner 2.

The diameter of the central portion 18 of the head portion 14 of the first pin member 12 is also ideally greater than a diameter of the loop 25 whereby the loop 25 is concealed by the head portion 14 when the opposite end portions 26 and 28 of the second pin member 22 are inserted into the headliner 2 and the foam backing 4 such that the loop 25 is positioned between the head portion 14 and the headliner 2.

In an embodiment, the distal end 17 of the spike portion 16 is blunt for preventing damage to the headliner 2 when the distal end 17 of the spike portion 16 abuts the headliner 2.

The head portion 14 of the first pin member 12 also includes a planar lower surface 15 for abutting the loop 25 of the second pin member 22.

Distal ends 27 and 29 of each of the opposite end portions 26 and 28 are pointed for facilitating insertion of the opposite end portions 26 and 28 into the headliner 2 and the foam backing 4.

In use, a desired decorative first pin member is selected and coupled to an associated second pin member by inserting the spike portion through the loop and attaching the spike portion to a washer. The opposite end portions of the second pin member are then inserted into the headliner and foam backing such that the opposite ends extend along a length of the foam backing just below the outer surface of the foam backing. Thus, the first pin member is securely fastened to the headliner and is visible to provide decoration as well as repair to loose headliners.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A headliner pinning assembly comprising:

a first pin member having a head portion and a spike portion;

a second pin member having a medial portion and a pair of opposite end portions extending outwardly from the medial portion, said medial portion forming a loop;

said spike portion being insertable through said loop;

a washer for coupling to said spike portion of said first pin member for coupling said first pin member to said second pin member;

said opposite end portions of said second pin member being adapted for inserting through a headliner and into a foam backing whereby said first pin member is held in a static position relative to the headliner; and said head portion of said first pin member having a central portion having a diameter greater than a diameter of said loop whereby said loop is concealed by said head portion when said loop is positioned between said head portion and the headliner when said opposite end portions of said second pin member are inserted into the headliner and the foam backing.

2. The headliner pinning assembly of claim 1, further comprising:

said opposite end portions of said second pin member being coplanar with said loop such that said opposite end portions extend generally orthogonally to said spike portion of said first pin member whereby said opposite end portions extend into the foam backing at an acute angle relative to an outer surface of said foam backing.

3. The headliner pinning assembly of claim 1, further comprising:

said head portion of said first pin member having a decorative configuration for enhancing the appearance of the headliner of the vehicle.

4. The headliner pinning assembly of claim 1, further comprising:

said washer being generally a planar disc having an outer perimeter edge, an inner perimeter edge and a hollow center;

said spike portion of said first pin member having a diameter greater than a diameter of said inner perimeter edge whereby said inner perimeter edge frictionally engages said spike portion when said spike portion is inserted through said hollow center of said washer.

5. The headliner pinning assembly of claim 4, further comprising:

a plurality of slits extending from said inner perimeter edge for facilitating engagement of said inner perimeter edge of said washer to said spike portion of said first pin member.

6. The headliner pinning assembly of claim 1, further comprising:

said head portion of said first pin member having a planar lower surface for abutting said loop of said second pin member.

7. The headliner pinning assembly of claim 1, further comprising:

a distal end of each of said opposite end portions being pointed for facilitating insertion of said opposite end portions into the headliner and the foam backing.

8. A headliner pinning assembly comprising:

a first pin member having a head portion and a spike portion;

a second pin member having a medial portion and a pair of opposite end portions extending outwardly from the medial portion, said medial portion forming a loop;

said spike portion being insertable through said loop;

a washer for coupling to said spike portion of said first pin member for coupling said first pin member to said second pin member;

said opposite end portions of said second pin member being adapted for inserting through a headliner and into a foam backing whereby said first pin member is held in a static position relative to the headliner;

said washer being generally a planar disc having an outer perimeter edge, an inner perimeter edge and a hollow center;

said spike portion of said first pin member having a diameter greater than a diameter of said inner perimeter edge whereby said inner perimeter edge frictionally engages said spike portion when said spike portion is inserted through said hollow center of said washer; and said head portion of said first pin member having a central portion having a diameter greater than a diameter of said outer perimeter edge of said washer whereby said washer is concealed by said head portion when said washer is positioned between said head portion and the headliner when said opposite end portions of said second pin member are inserted into the headliner and the foam backing.

9. The headliner pinning assembly of claim 8, further comprising:

said opposite end portions of said second pin member being coplanar with said loop such that said opposite end portions extend generally orthogonally to said spike portion of said first pin member whereby said opposite end portions extend into the foam backing at an acute angle relative to an outer surface of said foam backing.

10. The headliner pinning assembly of claim 8, further comprising:

said head portion of said first pin member having a decorative configuration for enhancing the appearance of the headliner of the vehicle.

11. The headliner pinning assembly of claim 8, further comprising:

a plurality of slits extending from said inner perimeter edge for facilitating engagement of said inner perimeter edge of said washer to said spike portion of said first pin member.

12. The headliner pinning assembly of claim 8, further comprising:

said head portion of said first pin member having a central portion having a diameter greater than a diameter of said loop whereby said loop is concealed by said head portion when said loop is positioned between said head portion and the headliner when said opposite end portions of said second pin member are inserted into the headliner and the foam backing.

13. The headliner pinning assembly of claim 8, further comprising:

said head portion of said first pin member having a planar lower surface for abutting said loop of said second pin member.

14. The headliner pinning assembly of claim 8, further comprising:
  a distal end of each of said opposite end portions being pointed for facilitating insertion of said opposite end portions into the headliner and the foam backing.

15. A headliner pinning assembly comprising:
  a first pin member having a head portion and a spike portion;
  a second pin member having a medial portion and a pair of opposite end portions extending outwardly from the medial portion, said medial portion forming a loop;
  said spike portion being insertable through said loop;
  a washer for coupling to said spike portion of said first pin member for coupling said first pin member to said second pin member;
  said opposite end portions of said second pin member being adapted for inserting through a headliner and into a foam backing whereby said first pin member is held in a static position relative to the headliner;
  said opposite end portions of said second pin member being coplanar with said loop such that said opposite end portions extend generally orthogonally to said spike portion of said first pin member whereby said opposite end portions extend into the foam backing at an acute angle relative to an outer surface of said foam backing;
  said head portion of said first pin member having a decorative configuration for enhancing the appearance of the headliner of the vehicle;
  said washer being generally a planar disc having an outer perimeter edge, an inner perimeter edge and a hollow center;
  said spike portion of said first pin member having a diameter greater than a diameter of said inner perimeter edge whereby said inner perimeter edge frictionally engages said spike portion when said spike portion is inserted through said hollow center of said washer;
  a plurality of slits extending from said inner perimeter edge for facilitating engagement of said inner perimeter edge of said washer to said spike portion of said first pin member;
  said head portion of said first pin member having a central portion having a diameter greater than a diameter of said outer perimeter edge of said washer whereby said washer is concealed by said head portion when said washer is positioned between said head portion and the headliner when said opposite end portions of said second pin member are inserted into the headliner and the foam backing;
  said diameter of said central portion of said head portion of said first pin member being greater than a diameter of said loop whereby said loop is concealed by said head portion when said loop is positioned between said head portion and the headliner when said opposite end portions of said second pin member are inserted into the headliner and the foam backing;
  a distal end of said spike portion being blunt for preventing damaging of the headliner when the distal end of the spike portion abuts the headliner;
  said head portion of said first pin member having a planar lower surface for abutting said loop of said second pin member; and
  a distal end of each of said opposite end portions being pointed for facilitating insertion of said opposite end portions into the headliner and the foam backing.

* * * * *